United States Patent
Yogeswaren et al.

(10) Patent No.: US 7,529,150 B2
(45) Date of Patent: May 5, 2009

(54) BOREHOLE APPARATUS AND METHODS FOR SIMULTANEOUS MULTIMODE EXCITATION AND RECEPTION TO DETERMINE ELASTIC WAVE VELOCITIES, ELASTIC MODULII, DEGREE OF ANISOTROPY AND ELASTIC SYMMETRY CONFIGURATIONS

(75) Inventors: Elan Yogeswaren, Houston, TX (US); Lucio N. Tello, Benbrook, TX (US); Thomas J. Blankinship, Fort Worth, TX (US)

(73) Assignee: Precision Energy Services, Ltd., Calgary (CA)

( * ) Notice: Subject to any disclaimer, the term of this patent is extended or adjusted under 35 U.S.C. 154(b) by 168 days.

(21) Appl. No.: 11/348,216

(22) Filed: Feb. 6, 2006

(65) Prior Publication Data

US 2007/0183259 A1    Aug. 9, 2007

(51) Int. Cl.
*G01V 1/44* (2006.01)
*G01V 1/46* (2006.01)

(52) U.S. Cl. .................... 367/25; 367/31; 367/35; 181/102; 181/104; 181/105

(58) Field of Classification Search ............... 367/25, 367/31, 32, 35; 181/102, 104, 105
See application file for complete search history.

(56) References Cited

U.S. PATENT DOCUMENTS

| | | | |
|---|---|---|---|
| 4,832,148 A | | 5/1989 | Becker |
| 5,265,067 A | * | 11/1993 | Chang .................. 367/31 |
| 5,808,963 A | | 9/1998 | Esmersoy |
| 5,831,934 A | * | 11/1998 | Gill et al. .............. 367/25 |
| 5,936,913 A | * | 8/1999 | Gill et al. .............. 367/25 |
| 6,538,958 B1 | | 3/2003 | Blankinship |
| 6,568,486 B1 | * | 5/2003 | George .................. 175/45 |
| 6,614,716 B2 | | 9/2003 | Plona |
| 6,791,899 B2 | | 9/2004 | Blanch |
| 2003/0167835 A1 | | 9/2003 | Sinha |
| 2007/0156359 A1 | * | 7/2007 | Varsamis et al. ........ 702/69 |

\* cited by examiner

*Primary Examiner*—Jack W. Keith
*Assistant Examiner*—Scott A Hughes
(74) *Attorney, Agent, or Firm*—Wong, Cabello, Lutsch, Rutherford, & Brucculeri, LLP

(57) ABSTRACT

An acoustic borehole logging system for generation and detection of multipole modes used to determine elastic properties of earth formations characterized as inhomogeneous anisotropic solids. The system concurrently generates and senses monopole, dipole, quadrupole and any higher order pole in the borehole/formation system in order to characterize the elastic properties and stress state of material penetrated by the borehole. Multipole modes of all orders are induced simultaneously without the need for separate transmitter and receiver systems. Performance of the logging system is not compromised due to eccentering of the axis of the tool in the borehole, tool tilt with respect to the axis of the borehole, or mismatch of response sensitivity of multiple receivers within the tool. The system comprises apparatus for generating and sensing acoustic signals in a borehole in an earth formation, and further comprises a processing method by which the sensor response signals are processed and analyzed to obtain desired formation parameters of interest.

10 Claims, 9 Drawing Sheets

BOREHOLE APPARATUS AND METHODS FOR SIMULTANEOUS MULTIMODE EXCITATION AND RECEPTION TO DETERMINE ELASTIC WAVE VELOCITIES, ELASTIC MODULII, DEGREE OF ANISOTROPY AND ELASTIC SYMMETRY CONFIGURATIONS

This invention is related to measurements of properties of earth formation penetrated by a well borehole. More particularly, the invention is related to a well borehole system that generates and detects acoustic energy of multipole modes that is processed to determine a plurality of formation properties of interest including elastic properties of the formation characterized as an inhomogeneous anisotropic solid.

BACKGROUND OF THE INVENTION

Acoustic well logging comprises the measure of various acoustic properties of formation penetrated by a well borehole. These measured properties are subsequently used to determine formation and borehole properties of interest including, but not limited to, formation porosity, formation density, stress distribution, formation fracturing, and formation anisotropy.

Elastic anisotropy manifests itself as the directional dependence of sound speed in earth formation. Anisotropy in earth formation may be due to intrinsic microstructure such as the case in shales, or may be due to mesostructure such as fractures, or may be due to macrostructure such as layering due to sedimentation. Whatever the cause for anisotropy may be, good estimates of elastic properties of anisotropic media are required in resolving seismic images accurately, in interpreting borehole logs and in estimating drilling mechanics parameters. Specifically, seismic lateral positioning, amplitude versus variation with offset (AVO) and vertical seismic profiling (VSP) interpretation, borehole stability and closure stress estimates are all dependent on an accurate and precise measure of the degree and configuration of anisotropy of subsurface formations. Even though prior art acoustic logging systems, such as the crossed dipole systems, have advanced the state of the art, the present state of borehole acoustic logging has not been able to measure the structure of elastic anisotropy in a consistent manner.

Prior art multimode acoustic logging systems are typified by acoustic transmitter excitation with radiation patterns of $2n^{th}$ order poles such as monopole (n=0), dipole (n=1) and quadrupole (n=2) as well as reception by a plurality of receivers with similar discrimination patterns. Examples of prior art systems are disclosed in Aron et al, "Real-Time Sonic Logging While Drilling in Hard and Soft Rocks", Paper HH, SPWLA $38^{th}$ Annual Logging Symposium, 1997; Tang et al, Chapter 5, "Quantitative Borehole Acoustic Methods", Elsevier, 2004; Varsamis et al, "LWD Shear Velocity Logging in Slow Formations Design Considerations and Case Histories", SPWLA $41^{st}$ Annual Logging Symposium, 2000; U.S. Pat. No. 5,753,812 "Transducer for Sonic Logging While Drilling", Aron, J., et al; and U.S. Pat. No. 6,213,250 "Transducer for Acoustic Logging, Wiesniewski, L. et al. Accordingly, a monopole measurement system will typically comprise one or more monopole transmitters and monopole receivers, and a dipole measurement system will typically comprise one or more dipole transmitters and dipole receivers. Prior art indicates, however, that when the axis of a borehole logging tool axis is eccentered or tilted with respect to the borehole axis, other undesired modes are also created in the borehole/formation system thereby contaminating the measurements of interest (see Leslie et al, "Eccentric Dipole Sources in Fluid-Filled boreholes: Numerical and Experimental Results", Journal of the Acoustical Society of America, Vol. 87, No., 6, pp. 2405-2421, 1990). The ability of the receivers to discriminate and filter out the unwanted modes is compromised by azimuthal aliasing as well as any phase and sensitivity mismatch of the plurality of receivers.

Prior art multipole acoustic logging systems comprise separate transducer systems for excitation and detection of each order multipole. Such a system is disclosed by Pistre et al., "A Modular Wireline Sonic Tool for Measurements of 3D (Azimuthal, Radial, and Axial) Formation Acoustic Properties", SPWLA $46^{th}$ Annual Logging Symposium, Jun. 26-29, 2005.

There is no known acoustic logging system that can efficiently generate and sense multiple modes simultaneously without unacceptable degradation in performance due to eccentering, tilt or receiver phase mismatch.

The prior art directed toward multipole mode acoustic logging systems is typically complex and is often impractical in a real-time borehole logging system. In addition, inaccuracies inherent in practical borehole measurements and the accuracy of required unknowns, such as formation elastic moduli or stress conditions, do not warrant such system complexity. As an example, a method commonly used in determining acoustic wave velocities (or slownesses), namely, the semblance technique, is more influenced by the group velocity rather than the phase velocity. In anisotropic media, the group and phase velocity vectors do not necessarily coincide thereby leading to measurement inaccuracies of indeterminate order. A prior art method for evaluating elastic wave velocities in anisotropic formations from borehole logging is disclosed in U.S. Pat. No. 6,772,067. This is a typical method employed in wireline acoustic crossed dipole logging. However, the performance of method is sensitive to the effects of eccentricity, tilt and receiver mismatch.

BRIEF SUMMARY OF THE INVENTION

The invention is an acoustic well borehole logging system directed toward the generation and detection of multipole modes for determination of elastic properties of earth formations characterized as inhomogeneous anisotropic solids. More specifically the system concurrently generates and senses monopole, dipole, quadrupole and any higher order pole in the borehole/formation system in order to characterize the elastic properties and stress state of formation penetrated by the borehole. Multipole modes of all orders, such as monopole, dipole, quadrupole, etc., are induced simultaneously without the need for separate transmitter and receiver systems. Furthermore, performance acceptability is not compromised due to eccentering of the axis of the tool in the borehole, tool tilt with respect to the axis of the borehole, or mismatch of response sensitivity of multiple receivers within the tool. The system comprises apparatus for generating and sensing acoustic signals in a borehole in an earth formation, and further comprises a processing method by which the sensor response signals are processed and analyzed to obtain desired formation parameters of interest.

The system apparatus comprises a downhole instrument or borehole "tool", surface equipment, and conveyance system comprising a data conduit and conveyance means for conveying the tool along the borehole and operationally connecting the tool with the surface equipment. Tool response data are conditioned and processed in a tool conveyed processor or in a processor disposed within the surface equipment to obtain formation and borehole parameters of interest. The conveyance means can comprise a wireline, or a tubular such as coiled tubing, or a drill string. The tool can alternately be embodied as a "pump-down" system, which is conveyed along the borehole by drilling fluid. In the pump-down embodiment, acoustic receiver data responses are recorded as a function of pump-down tool position within the borehole. The pump-down tool is subsequently retrieved at the surface of the earth, and the receiver response data are extracted from the tool and transferred to the surface equipment via the data conduit operationally connecting the tool to the surface equipment. Parameters of interest are then obtained by processing the data in the surface equipment.

The borehole tool comprises at least one acoustic impulse transmitter and a receiver array comprising at least two receiver stations spaced axially at predetermined distances from the transmitter. Each receiver station contains at least two azimuthally separated receiver elements at each station. The axial receiver station spacings and the azimuthal receiver element spacings around the axis of the tool need not be uniform. In the preferred embodiment the system is operated by firing the acoustic impulse transmitter with an amplitude weighting and phase weighting in the azimuthal direction to simultaneously generate all orders of multipoles that propagate along the borehole/formation system. Acoustic energy arriving at each element of the receiver array is finely sampled and digitized as a function of time. Each order pole at each receiver station is then extracted simultaneously by angular decomposition, and their velocities are determined across the same receiver array.

For purposes of disclosure, it will be assumed that the system is embodied as a wireline system and that the tool comprises a mandrel in which at least one transmitter and a receiver array are disposed. The preferred embodiment of the system comprises a broadband acoustic impulse transmitter, disposed on the mandrel and operable at selected frequencies to generate at least one mode, such as a dipole, in the borehole-formation environs. The receiver array, axially spaced on the mandrel from the one or more transmitter, then senses the induced headwaves in the borehole associated with the waves in the formation, as well as the guided modes along the borehole. A processor cooperating with the receiver array finely samples and records the data for processing.

The preferred method for conditioning and processing receiver array response is briefly summarized in the following steps:

(1) The digitization of a finely sampled pressure field over the receiver array.

(2) The identification of the propagating phases over the receiver array into each of the multipole modes such as monopole, dipole, quadrupole etc by an angular decomposition.

(3) The calculation of the velocities (or slownesses) of each of the mode components including monopole velocities (or slownesses), dipole velocities (or slownesses), quadrupole velocities (or slownesses), and the like.

(4) The identification of components of each multipole mode, such as monopole phase velocities that yield compressional and shear headwaves and Stoneley components if they exist. Dipole phase velocities will reveal whether or not there is birefringence due to anisotropy; and so on.

(5) The use of the results of steps (3) and (4) to solve the inverse problem to obtain the in the elastic moduli and geophysical properties of the formation as a function of depth in a local coordinate system associated with the borehole.

(6) The transformation of the results from step (5) into global coordinates of a global coordinate system associated with the location of the particular exploration or the development well being logged.

(7) The use of the results of steps (4), (5) and (6) to obtain the elastic state of the formation as a function of position within the borehole, wherein the position is stated in the global coordinate system.

BRIEF DESCRIPTION OF THE DRAWINGS

So that the manner in which the above recited features, advantages and objects the present invention are obtained and can be understood in detail, more particular description of the invention, briefly summarized above, may be had by reference to the embodiments thereof which are illustrated in the appended drawings.

DETAILED DESCRIPTION OF THE PREFERRED EMBODIMENTS

Overview

Figure 1A:
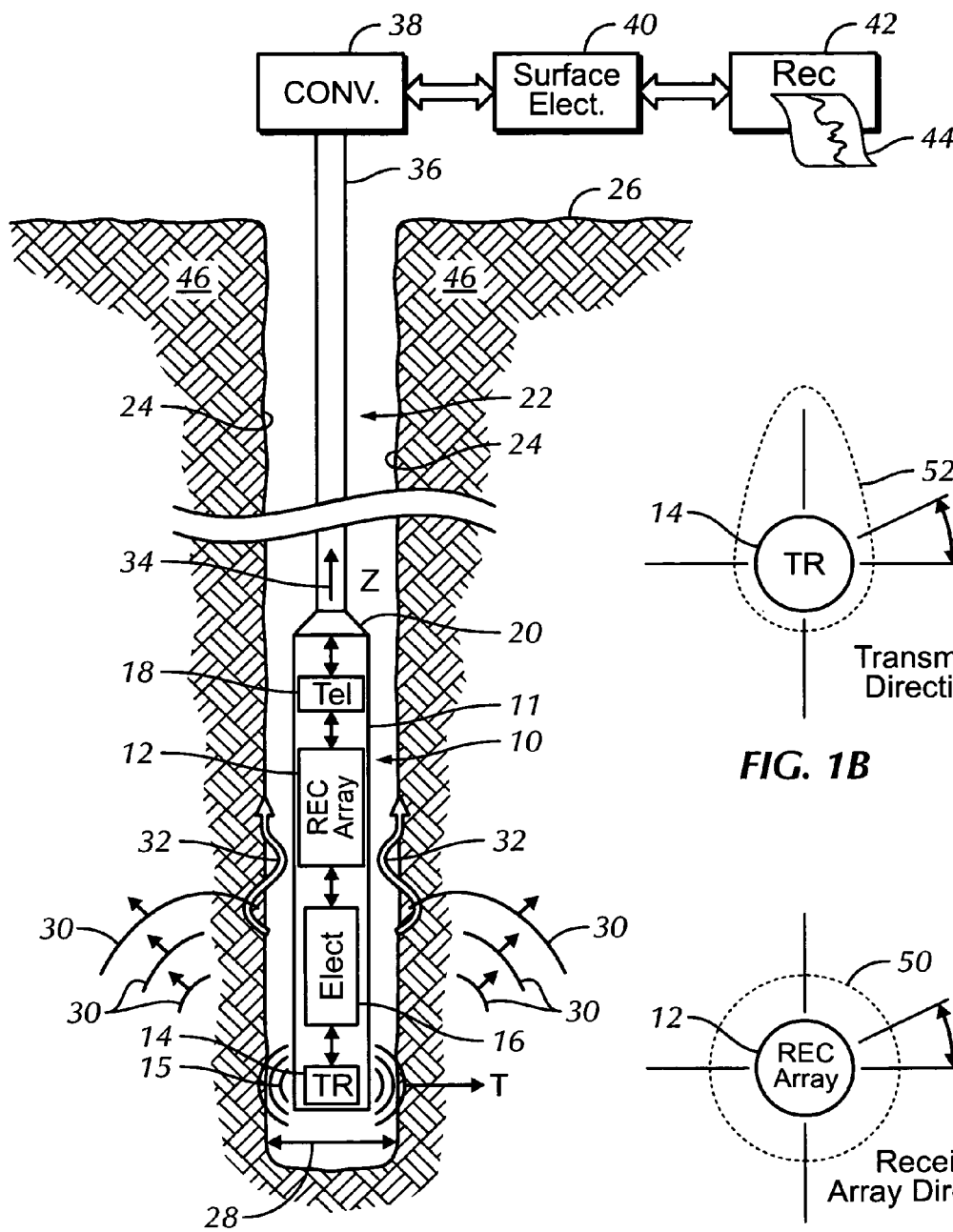
FIG. 1A conceptually illustrates the major elements of the acoustic logging system operating in a borehole environment.

The acoustic well logging system is used to determine a variety of properties and parameters of interest of the borehole and the formation material penetrated by the borehole. The quantities measured by the system are sometimes combined with other borehole or surface measurements to subsequently determine additional formation and borehole parameters of interest. These parameters of interest include, but not limited to, formation porosity, formation density, stress distribution, fracturing, and formation anisotropy.

A substantial portion of the disclosure is directed toward methodology for determining formation elastic moduli, degree of anisotropy, and elastic symmetry configuration. The methodology compensates for perturbations introduced when the logging tool is eccentered or tilted in the borehole. Stated another way, values of properties measured by the system are independent of relative orientation of major axes of the tool and the borehole. The methodology also compensates for any receiver element sensitivity mismatches.

Elastic anisotropy manifests itself as the directional dependence of sound speed in earth formation. Anisotropy in earth formation may be due to intrinsic microstructure such as the case in shales, or may be due to mesostructure such as fractures, or may be due to macrostructure such as layering of sedimentation. Whatever the cause for anisotropy may be, good estimates of elastic properties of anisotropic media are required in resolving seismic images accurately, in interpreting borehole logs, and in estimating drilling mechanics parameters. Specifically, seismic lateral positioning, AVO and VSP interpretation, borehole stability and closure stress estimates are all dependent upon an accurate and precise measure of the degree and configuration of anisotropy of subsurface formation material.

In order to provide information to obtain various borehole and formation parameters of interest, the logging system generates and detects multipole modes of acoustic radiation. More specifically the system concurrently generates and senses monopole, dipole, quadrupole and any higher order poles in the borehole and formation materials in order to characterize, among other properties of interest, the elastic properties and stress state of formation in the vicinity of the borehole. Multipole modes of all orders, such as monopole, dipole, quadrupole, etc., are created simultaneously without the need for separate transmitter and receiver systems. As mentioned previously, performance of the system is not compromised due to eccentering of the axis of the tool in the borehole, tool tilt with respect to the axis of the borehole, or mismatch of response sensitivity of multiple receivers within the tool.

In disclosing the logging system, apparatus will first be discussed. Following will be a detailed disclosure of methodology for converting measured response of the apparatus to a variety of borehole and formation parameters of interest. In this disclosure, the term "borehole environs" comprises both formation material penetrated by the borehole as well as the borehole including any material therein such as drilling mud.

Apparatus

Attention is directed to FIG. 1A, illustrates the logging system disposed in a well borehole 22 defined by borehole wall 24 and penetrating earth formation 46. The nominal diameter of the borehole 22 is denoted at 28. FIG. 1A conceptually illustrates the major elements of the acoustic logging system operating in a borehole environment. The system comprises three major elements, which are a downhole instrument or "tool" 10, a data conduit 36, and a conveyance means 38 disposed at the surface 26 of the earth. If the system is embodied as a wireline logging system, the tool 10 comprises a mandrel pressure housing 11, the data conduit 36 is a wireline, and the conveyance means is a draw works apparatus comprising a winch and a suitable winch power source. If the system is conveyed as a tubing conveyed logging system, the tool 10 again comprises a mandrel pressure housing 11, the data conduit 36 is coiled tubing, and the conveyance means 38 is a coiled tubing injector-extractor unit. If the system is embodied as a logging-while-drilling (LWD) system, the tool 10 comprises a drill collar, the data conduit 36 is drill string, and the conveyance means 38 is a rotary drilling rig. Using any of these embodiments, the conveyance means 38 cooperates with surface equipment 40 which comprises power sources, up hole telemetry, control electronics, data processors and the like depending upon the specific embodiment. For purposes of disclosure, it will be assumed that the system is embodied as a wireline logging system.

Again referring to FIG. 1A, the tool 10 comprises at least one acoustic impulse transmitter 14, a receiver array 12, an electronics package 16, and a downhole telemetry unit 18. These elements are enclosed within a pressure housing 11. The receiver array 12 comprises at least two receiver stations axially spaced at predetermined distances from the transmitter 14. Each receiver station comprises at least two azimuthally separated receiver elements. Details of the receiver array 12 will be discussed in subsequent sections of this disclosure. The receiver array 12 and transmitter 14 are operationally connected to the electronics package 16. The electronics package 16 comprises elements that control the operation of the transmitter 14 and the receiver array 12. The electronic package 16 also comprises an analog-to-digital converter (ADC) for digitizing analog signals from the receiver array 12, a processor for at least partially processing signals from the receiver array 12, means for at least distributing power to all elements within the tool 10, and a communication link to the downhole telemetry unit 18. Again assuming that the logging system is configured as a wireline logging system, the tool 10 is operationally connected via a cable head connector 20 to a lower end of a wireline cable 36. The upper end of the wireline cable 36 is operationally connected to the conveyance means 38 which is a wireline draw works comprising a winch and a winch motor. The cable 36 is electrically connected to surface equipment 40 via winch slip rings, as is known in the art. The surface equipment 40 comprises a surface telemetry unit (not shown) which receives and transmits data from and to the tool 10 via the cable 36 and t the cooperating downhole telemetry unit 18. The surface equipment 40 can optionally comprise one or more power supplies to provide power, via the cable 36, to the electronics package 12 for distribution to one or more elements within the tool 10. The surface equipment 40 can also comprise a surface processor (not shown) for processing digitized receiver array data that has been telemetered to the surface via the downhole telemetry unit 18, the cable 36, and the surface telemetry unit. The surface equipment 40 typically cooperates with a recorder 42, which can be a digital recorder or an analog recorder. The recorder outputs "logs" of parameters of interest, determined using the logging system, as a function of position at which they are measured within the borehole 22. The position is preferably expressed in global coordinates of a global coordinate system. Alternately, the position can be expressed in a local borehole coordinate system. Coordinate systems and reference frames to which they correspond are discussed and illustrated in detail in subsequent sections of this disclosure.

Still referring to FIG. 1A, the transmitter 14 emits repetitive impulses of acoustic energy which pass through the borehole 22 and into the formation 46, as indicated conceptually by the wavefronts 15 and the vector "T". Transmitted acoustic energy impulses propagate through the formation 46 as formation waves, as illustrated conceptually at 30. Transmitted acoustic energy impulses also propagate along the wall 24 of the borehole 22, as illustrated conceptually at 32. A portion of the transmitted acoustic energy, propagating essentially along the "Z" coordinate as illustrated by the arrow 34, reaches and is detected by the receiver array 12.

Figure 1B:
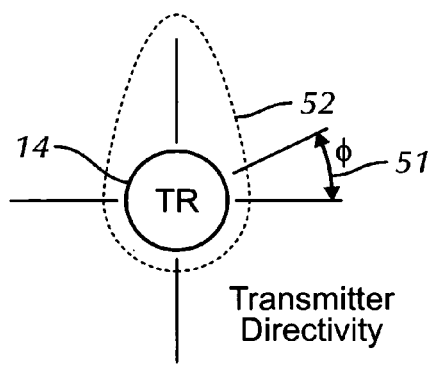
FIG. 1B is a sectional view of a transmitter 14 that emits acoustic energy with an asymmetric radiation.

FIG. 1B is a sectional view of the transmitter 14, which emits acoustic energy preferably with an asymmetric radiation pattern as a function of an angle $\phi$ denoted at 51, in a plane perpendicular to the major axis of the borehole 22. The asymmetric radiation pattern is illustrated conceptually by the broken line 52. It is noted, however, that the radiation pattern 52 is only for purposes of illustrating an asymmetric transmission and is not necessarily the same as the pattern generated by the system in a borehole environment.

Figure 1C:
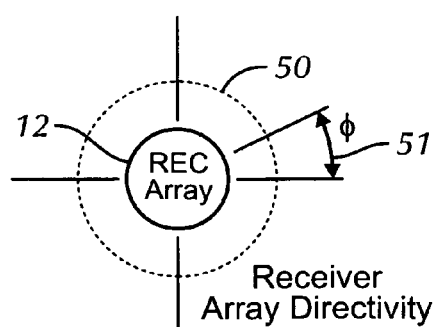
FIG. 1C is a sectional view of the receiver array 12 with an axisymmetric reception pattern.

FIG. 1C is a sectional view of the receiver array 12 with an axisymmetric reception pattern as a function of an angle $\phi$, denoted again at 51, in a plane perpendicular to the major axis of the borehole 22. The axisymmetric reception pattern is illustrated conceptually by the broken curve 50.

Figure 2A:
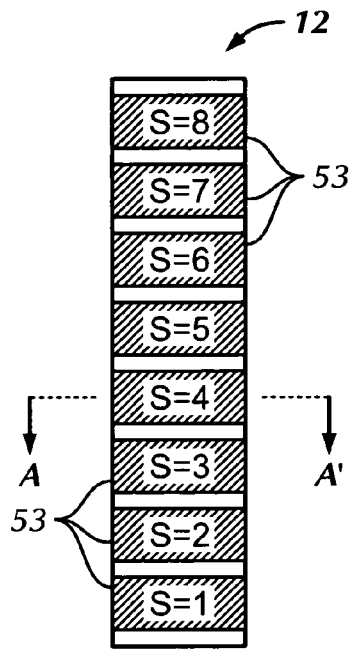
FIG. 2A is a side view of a receiver array showing a plurality of receiver stations disposed at different axial spacings from the transmitter.
Figure 2B:
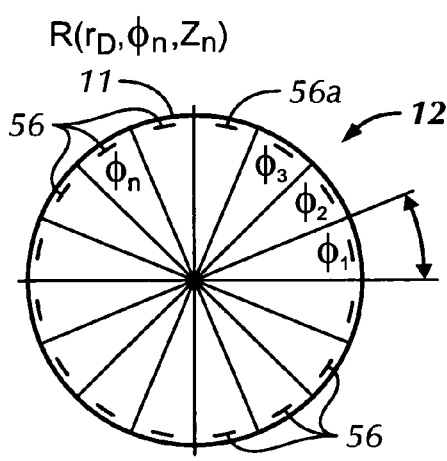
FIG. 2B is a sectional view of the receiver array at a receiver station illustrating receiver elements distributed radially around the axis the receiver station.

FIGS. 2A and 2B illustrate, in more detail, the elements and features of the receiver array 12.

FIG. 2A is a side view of the receiver array 12 showing a plurality S of receiver stations 53 disposed at different axial spacings from the transmitter 14. More specifically, FIG. 2A illustrates a receiver array 12 with eight receiver stations (s=1, 2, ... 8) which are axially spaced a distance $z_n$ from the transmitter and denoted with the indices (n=1, ..., 8).

FIG. 2B is a sectional view A-A' of the receiver array 12 through the receiver station s=4 which is spaced a distance $z_4$ from the transmitter 14. Each receiver station $z_n$ comprises discretized receiver elements 56 shown distributed around the axis 60 of the receiver array 12 and near the periphery of the tool mandrel 11. The axis 60 is also the major axis of the tool 10. Each receiver element is designated as $$R(r_D,\phi_n,z_n), \quad (1)$$

where
$r_D$ is the radius from the mandrel axis 60 to the active plane of the element 56 as shown in FIG. 2B,
$\phi_n$ is the nth azimuthal sector of the receiver station, and
$z_n$ is the spacing from the transmitter of the s=n axial station of the array 12.

Using as examples the receiver array 12 side and sectional views in shown FIGS. 2A and 2B, respectively, there are eight receiver stations (s=1, s=2, ..., s=8). FIG. 2B shows for receiver station s=4, sixteen (n=1, 2, ..., 16) azimuthal sectors each comprising a receiver element 56 denoted as $\phi_1$, $\phi_2$, ... $\phi_{16}$. All elements are disposed at a distance $r_D$ from the axis 60. Using the notation scheme above, the receiver element 56a is therefore denoted as $R(r_D, \phi_3, z_4)$, where again $z_4$ indicates the axial spacing of the S=4 receiver station from the transmitter 14.

It is noted that the axial receiver station spacings $z_n$ and the azimuthal receiver element spacings around the axis 60 of the tool need not be uniform.

In an alternate embodiment of the receiver stations, a single rotating receiver element that responds to acoustic energy at a plurality of azimuthal locations, such as predetermined radial sectors, can be used instead of the plurality of discrete receiver elements 56. Such a rotating receiver is disclosed in U.S. patent application Ser. No. 11/316,024 filed on Dec. 21, 2005 and assigned to the assigned of this disclosure. application Ser. No. 11/316,024 is entered into this application by reference.

To summarize, attention is again directed to FIGS. 1A, 1B, 1C, 2A and 2B. The preferred embodiment of the receiver array 12 comprises at least four but preferably eight receiver stations 53, with each receiver station comprising at least eight angular broadband (500 Hz to 50 kHz) receiver elements 56 operated in conjunction with at least one broadband transmitter 14. The transmitter emits in repetitive pulses asymmetric acoustic fields that generate or "induce" responses in the plurality of receiver elements 56. Measured responses are referenced preferably to a global coordinate system via measurements of depth, azimuth and deviation, as will be discussed subsequently. The frequency range of the transmitter is preferably in the range 500 Hertz (Hz) to 20 kilohertz (kHz), and the transmitter is operated at a pulse repetition rate in the range of 1 to 10 pulses per second.

Basic System Response

In the preferred embodiment, the logging system is operated by firing the acoustic impulse transmitter 14 with an amplitude weighting and phase weighting in the azimuthal direction to simultaneously generate all orders of multipoles that propagate along the borehole-formation environs. Acoustic energy arriving at each element 56 of the receiver array 12 is finely sampled and digitized as a function of time. Each order pole at each receiver station is then extracted simultaneously by angular decomposition, and their corresponding velocities are determined across the same receiver array, as will be discussed in detail in subsequent sections of this disclosure.

Analog receiver responses from each receiver element 56 are preferably digitized in the electronics package 16 (see FIG. 1). A one dimensional digitized image of the acoustic field is obtained over each axial sector s=n at axial spacing $z_n$ of the unwrapped receiver array plane (see FIG. 2B). As an example, for the receiver station s disposed an axial distance at $z_s$ from the transmitter, the digital image is defined as $$x^{(s)}(i,j), \quad (2)$$

where
s=1 to S,
S=the total number of receiver stations,
i=1 to I is an index over the sample number,
I=the number of temporal wave samples,
j=1 to J is an index over the azimuthal receiver element sectors $\phi_n$, and
J=the number of receiver elements at the s receiver station.

An array of decomposed basis images $y^{(s)}(i,m)$ is obtained from this $x^{(s)}(i,j)$ field via an image transform unitary matrix V(k,l) as $$y^{(s)}(i,m)=x^{(s)}(i,j)V(j,m), \quad (3)$$

where
m=1 to M is an index over the basis images, and
M=the number of basis images (i.e. monopole, dipole, etc).
The indices i, and j have been defined above. The transform method can be chosen to optimize the calculation. As an example, one version of the discrete cosine transform (DCT-I) can be used as disclosed by Burrus et al., "Computer Based Exercises for Signal Processing", Prentice Hall, New Jersey, 1994, pp. 77-81, which is entered into this disclosure by reference.

Decomposition of Acoustic Waves and Determination of Waveform Parameters

Borehole guided waves and formation waves are conceptually illustrated in FIG. 1 at 32 and 30, respectively. A determination of multipole modes can be used to determine optimum settings for the transmitter 12, and for determining parameters of interest in and within the immediate vicinity of the well borehole. The following section discloses methodology for decomposing waveform responses of the receiver array 12 into multipole modes.

The propagating phases over the receiver array 12 are decomposed into each of the multipole modes, such as monopole, dipole, quadrupole, and the like, by angular decomposition.

Figure 3:
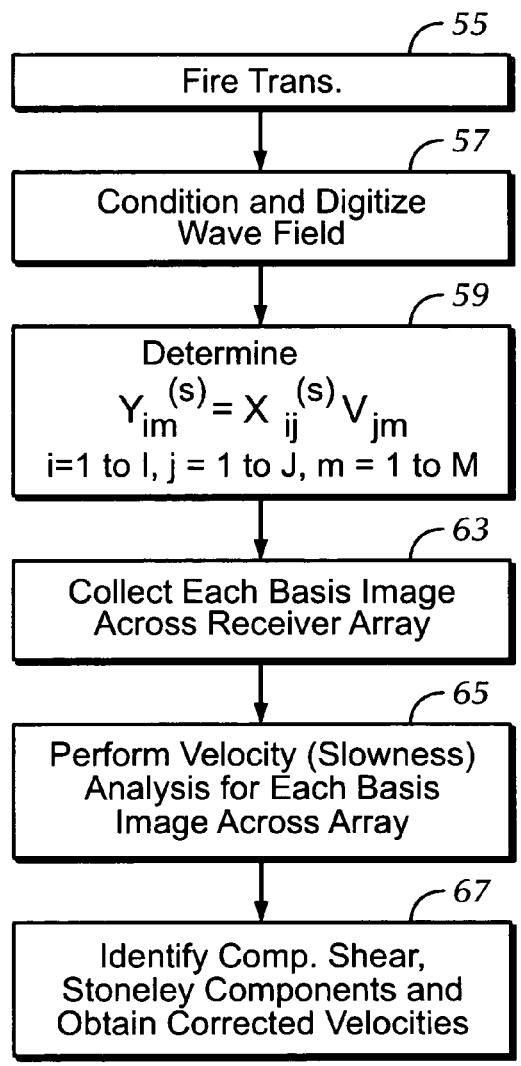
FIG. 3 is a flow chart summarizing steps necessary to collect, digitize, decomposition measured receiver array response data.

FIG. 3 is a flow chart summarizing steps necessary to collect, digitize, and decompose the measured receiver element data. Once the waveforms are decomposed, parameters of interest are determined using the decomposed waveforms. These parameters of interest include, but are not limited to, acoustic wave velocity (slowness) for compressional, shear, Stoneley components, as will be discussed and illustrated in subsequent sections of this disclosure. In addition, corrected velocities for these waveform components are obtained. Attention will first be directed toward the collection, digitizing and decomposition of the receiver element response data.

Again referring to FIG. 3, the transmitter is fired at step 55, and the firing typically serves as a zero time reference point for subsequent velocity and slowness analyses. Transmitter firing is implemented preferably by a preprogrammed signal generated in the electronics package 16. Analog waveforms measured by the elements 56 of the detector array 12 are digitized at step 57, preferably using an ADC (not shown) disposed within the electronics package 16 of the tool 10. At step 59, the basis images $y^{(s)}(i,m)$ are determined over the indices s, i, m as discussed in conjunction with equations (2) and (3) above thereby decomposing the measured waveforms. Each basis image across the receiver array 12 is collected at step 63. A velocity (slowness) analysis for each basis image across the receiver array 12 is performed at step 65. Finally, compressional, shear, Stoneley wave velocities are obtained and corrected at step 67. The basis images, given by the vertical columns of matrix elements $y^{(s)}(i,m)$ shown in equation (3), may or may not correspond to uncoupled multipole components, depending on the measurement configuration and material symmetry around the borehole. In cases where this correspondence exists, the multipole component characteristics such as amplitude versus frequency and velocity versus frequency can be determined.

Figure 4A:
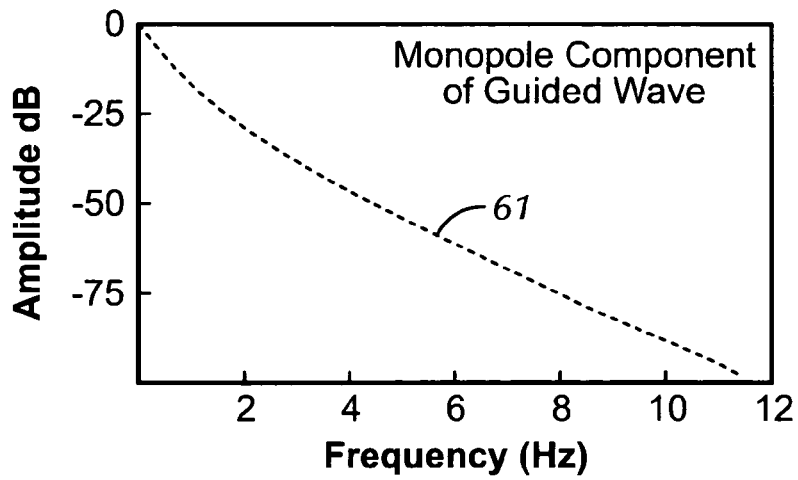
FIG. 4A illustrates results of modal decomposition for monopole borehole guided waves.
Figure 4B:
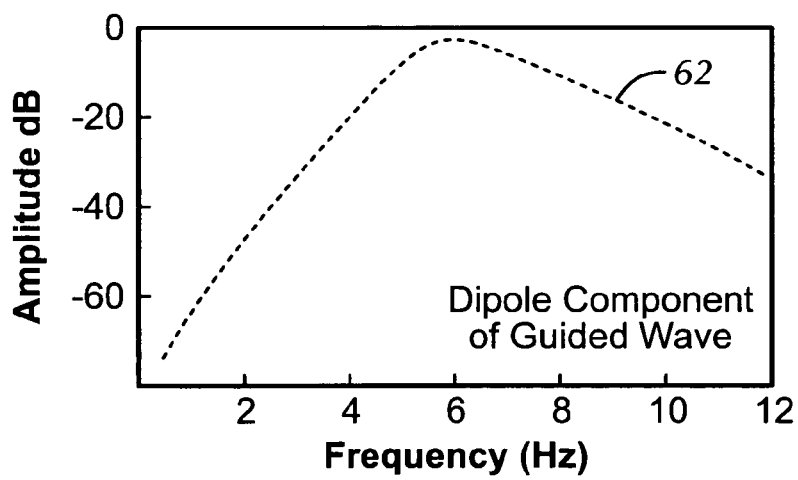
FIG. 4B illustrates results of modal decomposition for dipole borehole guided waves.
Figure 4C:
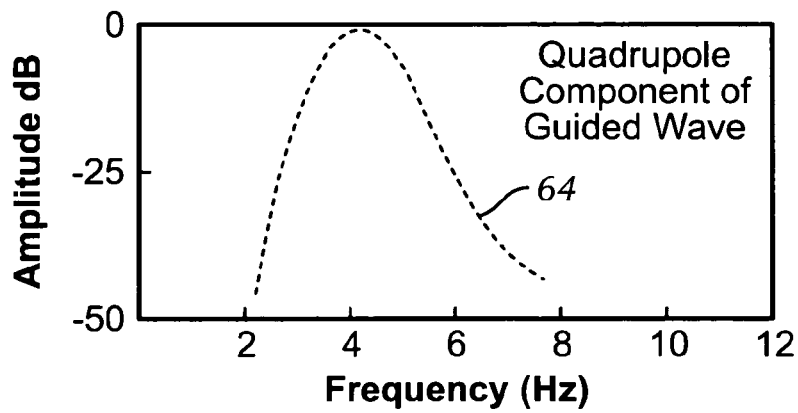
FIG. 4C illustrates results of modal decomposition for quadrupole borehole guided waves.

FIGS. 4A, 4B and 4C are amplitude versus frequency plots. These plots illustrate results of modal decomposition for monopole, dipole and quadrupole components, respectively, showing the resonance characteristics of borehole guided waves. More specifically, curves 61, 62 and 64 in FIGS. 4A, 4B and 4C correspond, respectively, to the amplitude variations of Stoneley wave, flexural wave and screw waves as a function of frequency. These particular tool response parameters are used for selecting the resonance frequencies and bandwidths of the transmitter 14 to generate the required modes.

Figure 5A:
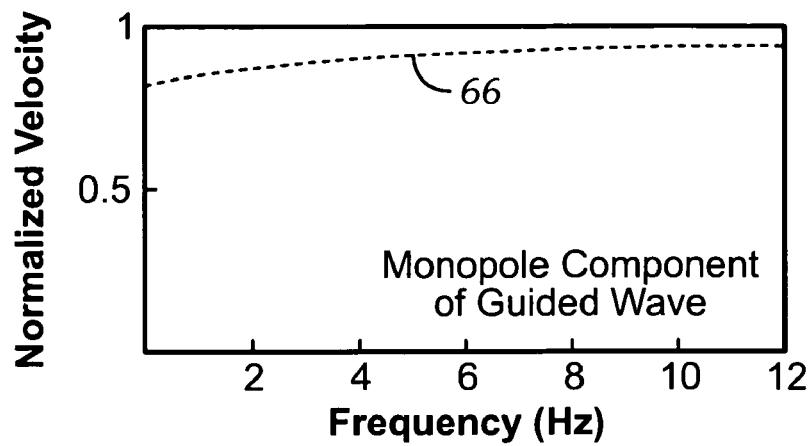
FIG. 5A illustrates the dispersion characteristics of the monopole component of guided waves.
Figure 5B:
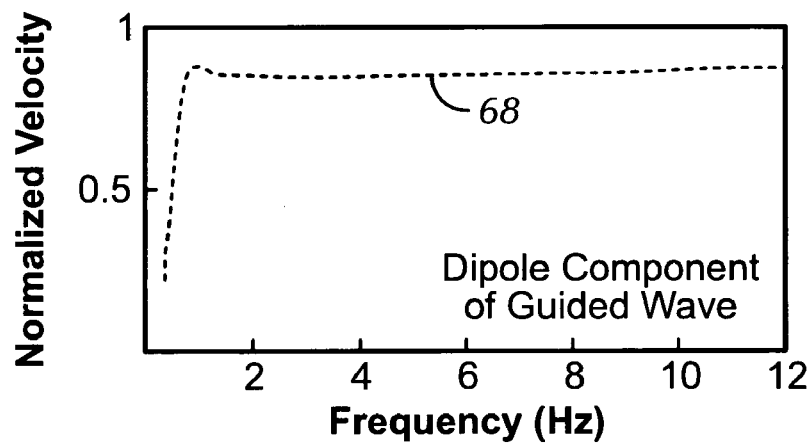
FIG. 5B illustrates the dispersion characteristics of the dipole component of guided waves.
Figure 5C:
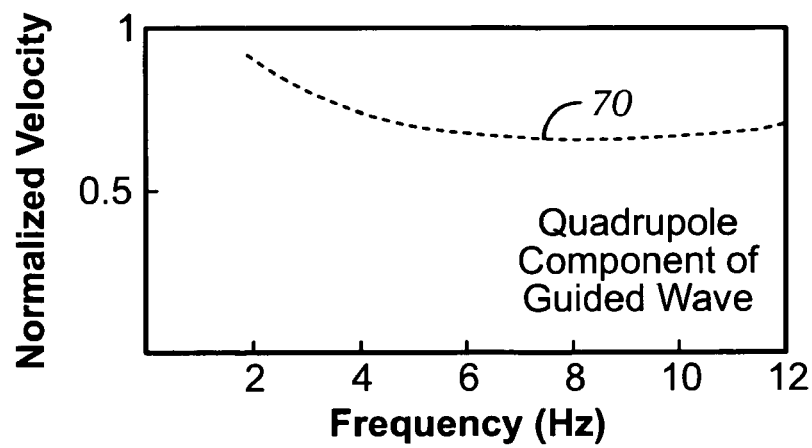
FIG. 5C illustrates the dispersion characteristics of the quadrupole component of guided waves.

FIGS. 5A, 5B and 5C are velocity versus frequency plots. These plots illustrate, respectively, the dispersion characteristics of monopole, dipole and quadrupole components, respectively, of guided waves. More specifically, curves 66, 68 and 70 in FIGS. 5A, 5B and 5C correspond to the normalized velocity of Stoneley wave, flexural wave and screw waves as a function of frequency. These tool response parameters illustrate that the quasishear mode velocities and mud velocity can be evaluated from dispersion characteristics with appropriate corrections.

Figure 6:
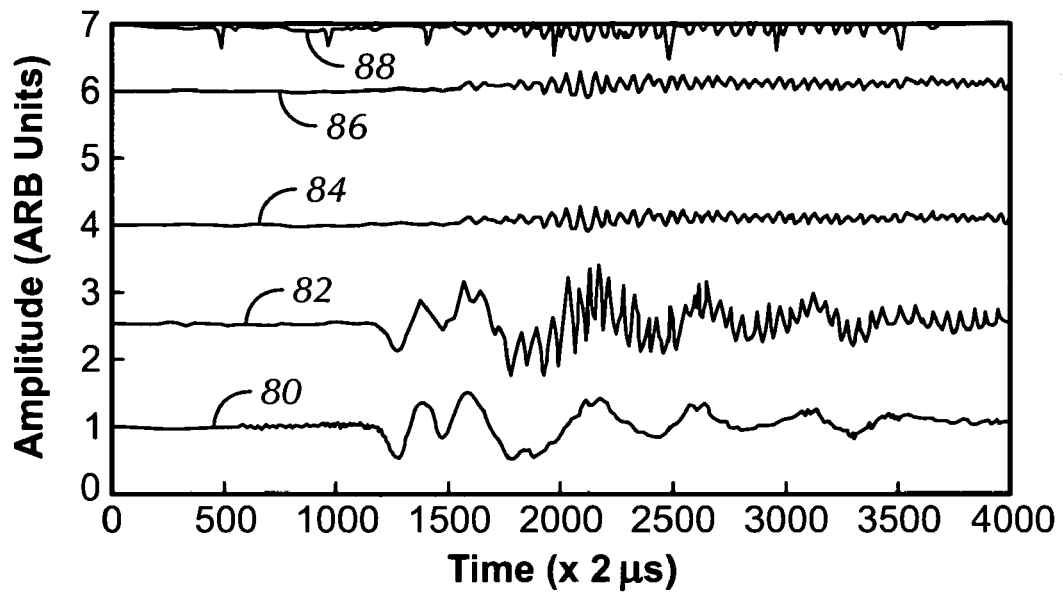
FIG. 6 illustrates component amplitudes of a multipole decomposition of the transmitter radiation field plotted as function of time.

FIG. 6 illustrates amplitudes of a multipole decomposition of the transmitter radiation field plotted as function of time, where time is measured from a predetermined reference point. The decompositions were made using methodology discussed above and summarized in the flow chart of FIG. 3. Amplitudes, in decibels (dB), of monopole, dipole, quadrupole, hexapole and octupole components are identified as 80, 82, 84, 86 and 88, respectfully, and are shown plotted as a function of time in units of microseconds ($\mu$s). The "zero" time reference preferably corresponds to the firing of the transmitter 14.

Figure 7:
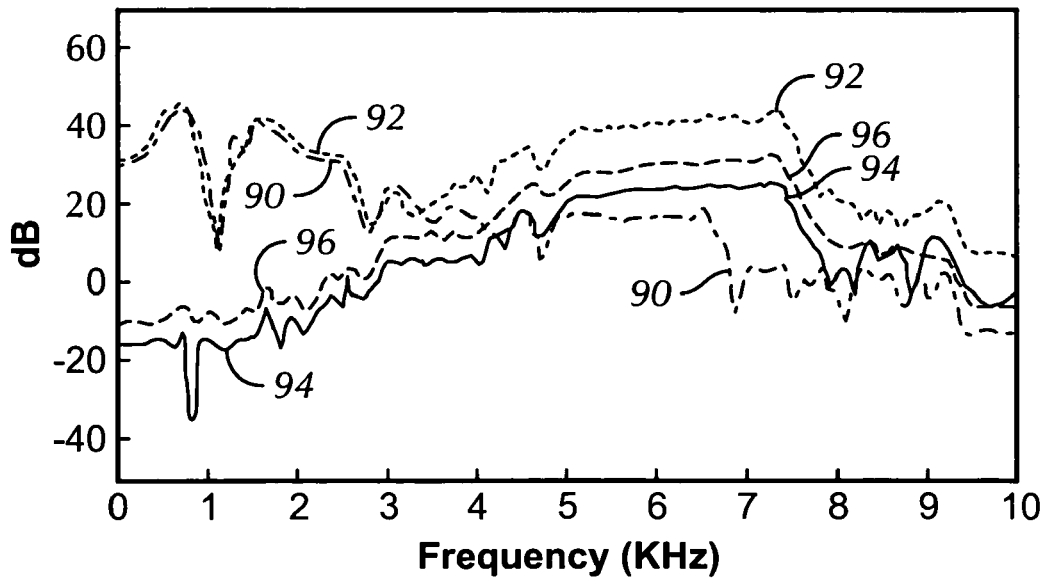
FIG. 7 illustrates component amplitudes of multipole decomposition of the same transmitter radiation field plotted as function of frequency.

FIG. 7 illustrates amplitudes, in dB, of multipole decomposition of the same transmitter radiation field plotted as function of frequency, where frequency is measured in kilohertz (kHz). More specifically, of monopole, dipole, quadrupole, and hexapole components are identified as 90, 92, 94, and 96, respectfully. The decomposition was again made using the decomposition routine discussed previously and illustrated summarily in flow chart form in FIG. 3 at step 59.

Figure 8:
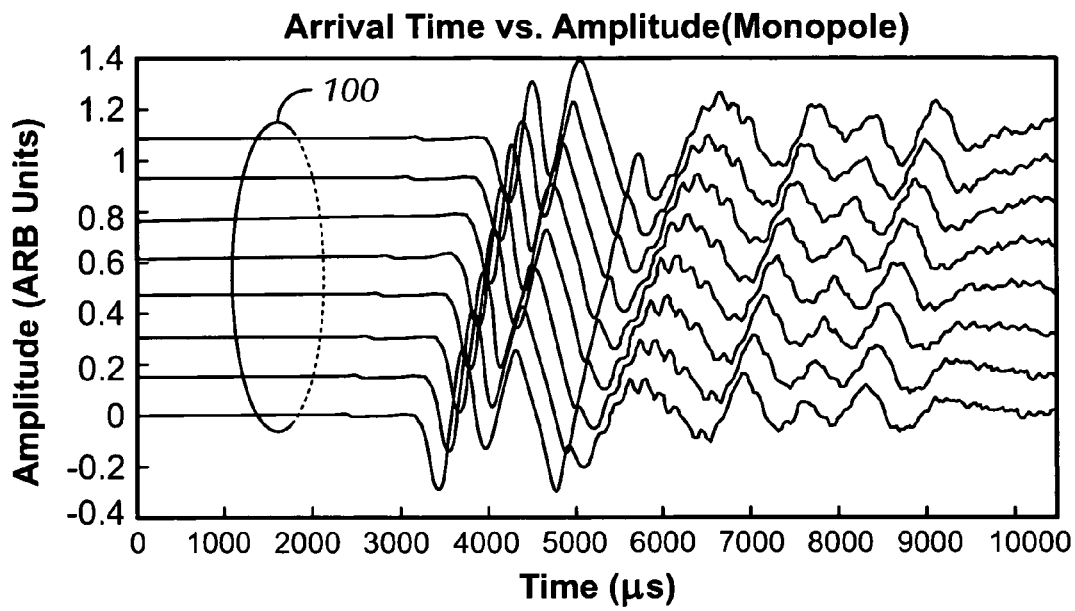
FIG. 8 is a receiver waveform plot of the monopole component amplitude as a function of time.

Basis images $y^{(s)}(i,m)$ have been defined and discussed previously, and expressed mathematically in equation (3). FIG. 8 is a receiver waveform plot of monopole amplitude (arbitrary units) as a function of time ($\mu$s) illustrating arrival time at a receiver array 12 comprising eight axial stations as shown in FIG. 2B. Using previously defined formalism, FIG. 8 is a plot of the first set of basis images (m=1)

$$y^{(s)}(i,1), (s=1, 2, 3, \ldots S) \tag{4}$$

where S=8.

The "zero" time is the previously mentioned reference point that is preferably the firing or "pulsing" of the transmitter 14. All eight curves are identified as a group at 100. Referring to the array shown in FIG. 2A and using previously defined nomenclature, the lower most curve showing the earliest arrival represents the response of receiver station s=1, the curve showing the next arrival represents the response of receiver station s=2, and the curve showing the latest arrival (the upper curve) represents the response of receiver station s=8.

Figure 9:
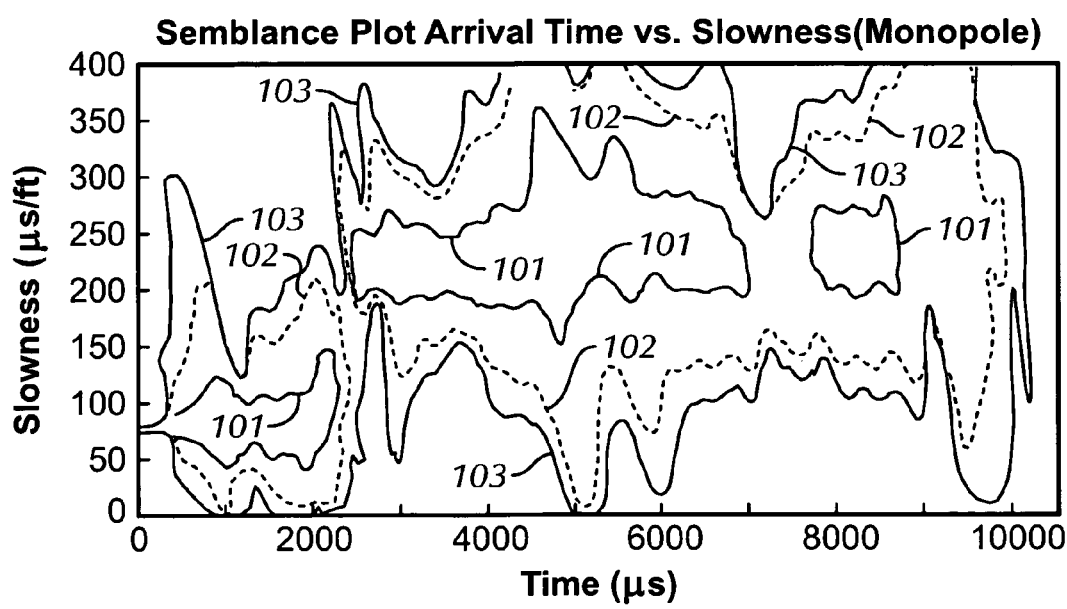
FIG. 9 is a conceptual semblance plot, for the above monopole data set, showing arrival time versus slowness.

FIG. 9 is a conceptual semblance plot, for the same monopole data set, showing arrival time ($\mu$s) versus slowness ($\mu$s/foot). Contour 101 represents the maximum value, contour 102 represents an intermediate value, and contour 103 represents the minimum value.

Figure 10:
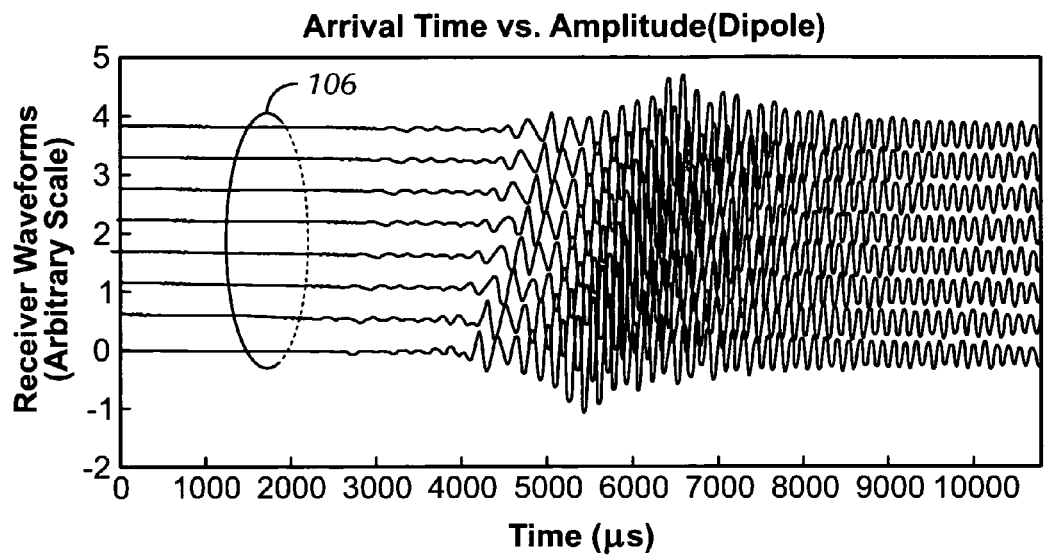
FIG. 10 is a receiver waveform plot of dipole component amplitude as a function of time.

FIG. 10 is a receiver waveform plot of dipole amplitude (arbitrary units) as a function of time ($\mu$s) illustrating arrival time again at the receiver array 12 comprising eight axial stations as show in FIG. 2B. Again using previously defined formalism, FIG. 10 is a plot of the second set of basis images (m=2)

$$y^{(s)}(i,2), (s=1, 2, 3, \ldots 8). \tag{4}$$

The "zero" time is again preferably corresponds to the pulsing of the transmitter 14. All eight curves are identified as a group at 106. Again referring to the array shown in FIG. 2A and using previously defined nomenclature, the lower most curve showing the earliest arrival represents the response of receiver station S=1, the curve showing the next arrival represents the response of receiver station s=2, and the curve showing the latest arrival (the upper curve) represents the response of receiver station s=8.

Figure 11:
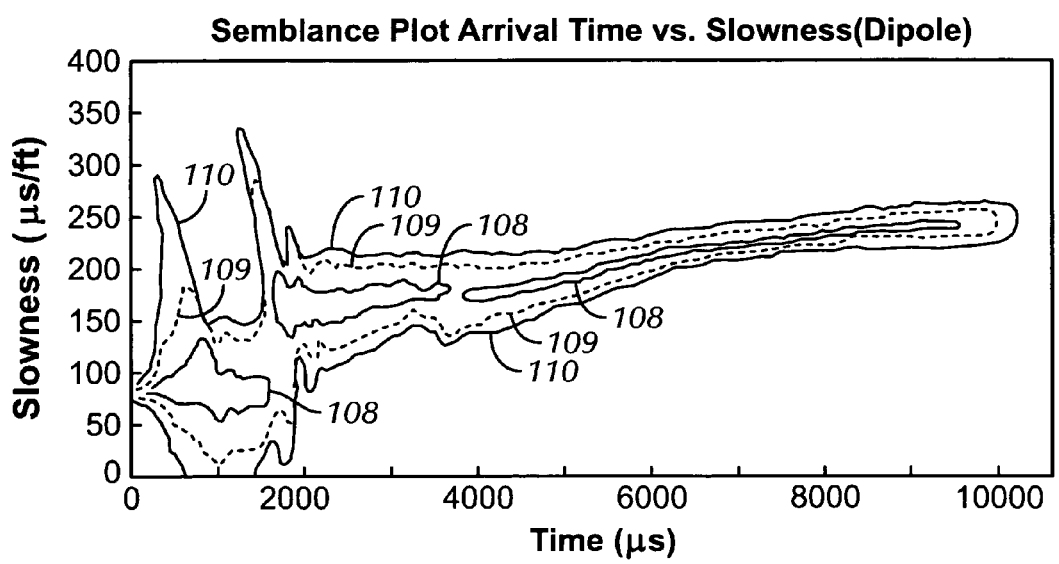
FIG. 11 is a conceptual semblance plot, for the above dipole data set, showing arrival time versus slowness.

FIG. 11 is a semblance plot, for the same dipole data set, showing arrival time (µs) versus slowness (µs/foot). Contour 108 represents the maximum value, contour 109 represents an intermediate value, and contour 110 represents the minimum value.

As mentioned preciously, FIG. 1A shows the major axis 60 (see FIG. 2B) coincident with the major axis of the borehole 22. The tool 10 can, however, be eccentered or tilted or both eccentered and tilted within the borehole.

Figure 12:
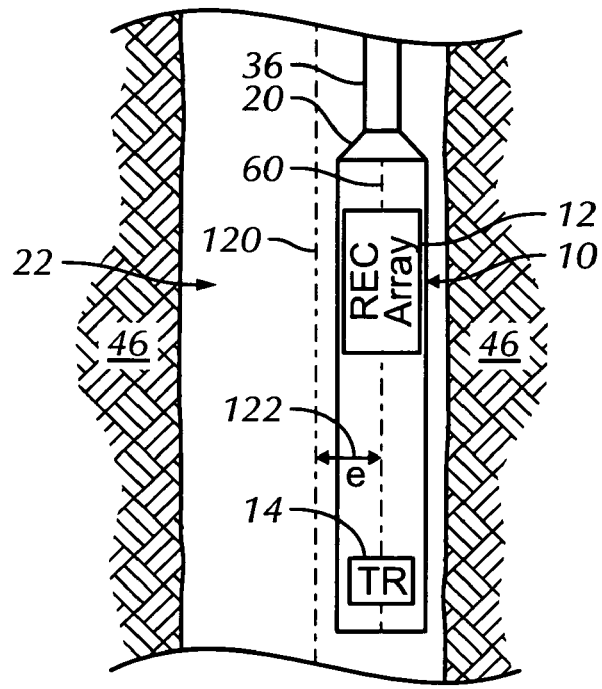
FIG. 12 shows the borehole logging tool disposed within a borehole with the major axis of the tool eccentered with respect to the major axis of the borehole.
Figure 13:
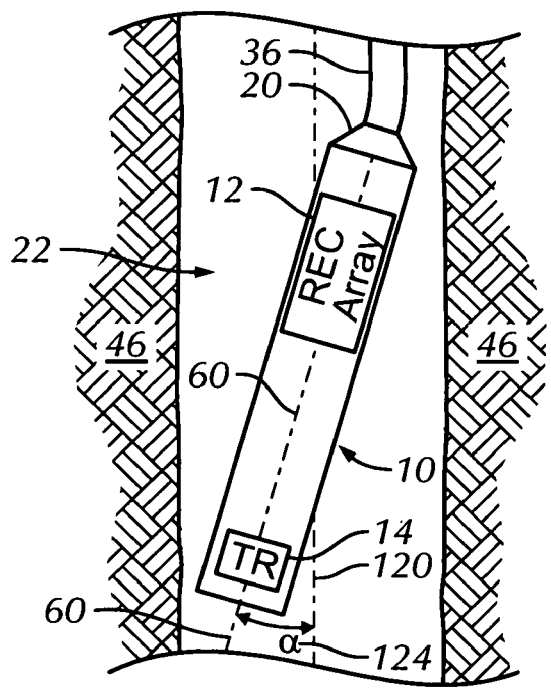
FIG. 13 shows the borehole logging tool disposed within a borehole with the major axis of the tool tilted with respect to the major axis of the borehole.

FIG. 12 shows the tool 10 disposed within the borehole 22 with the major axis 60 of the tool eccentered a distance "e", indicated at 122, from the major axis 120 of the borehole. FIG. 13 shows the tool 10 disposed within the borehole 22 with the major axis 60 of the tool 10 tilted at an angle α, indicated at 124, from the major axis 120 of the borehole. These configurations occur primarily in deviated and horizontal boreholes, and can exert a significant influence on all of the previously discussed acoustic measurements. Stated another way, tool eccentricity and tilt both create spurious unwanted modes in the borehole that are eliminated by the modal composition discussed previously and illustrated conceptually at step 59 of FIG. 3. The present system eliminates the need for prior art "time-of-flight" compensation techniques that, as an example, require transmitters above and below the receiver array. The modal decomposition technique also corrects for any sensitivity mismatches in the elements of the receiver array.

To summarize, the previous section including FIGS. 4A through 11, the related discussion, and mathematical formalism are directed toward modal parameters of interest that are obtained by decomposing receiver array responses. The next section of the disclosure is directed to determining elastic moduli, the degree of anisotropy and the elastic symmetry of formation penetrated by the well borehole.

Elastic Moduli, Degree of Anisotropy and Elastic Symmetry Configuration

A knowledge of formation geophysical properties such as elastic moduli, the degree of anisotropy, elastic symmetry configuration, and formation stress fields are critical in a number of seismic and borehole geophysical operations. Furthermore, it is important not only to measure these parameters of interest as a function of depth along the borehole, but also to express any and all local anisotrophic formation axes of these properties with respect to global coordinates. Properties measured in a plurality of individual wells can then be correlated to obtain three dimensional maps of these properties over a multiwell field. Such maps are subsequently used in various seismic evaluations including AVO and VSP to determine step-out or in-fill drilling locations for additional well boreholes.

Formation properties of interest are determined by first idealizing the formation as an elastic medium. This elastic medium can have triclinic symmetry with 21 independent elastic constants $C_{11}$, $C_{12}$, $C_{13}$, $C_{14}$, $C_{15}$, $C_{16}$, $C_{22}$, $C_{23}$, $C_{24}$, $C_{25}$, $C_{26}$, $C_{33}$, $C_{34}$, $C_{35}$, $C_{36}$, $C_{44}$, $C_{45}$, $C_{46}$, $C_{55}$, $C_{56}$ and $C_{66}$. Monoclinic symmetry reduces the number of independent elastic constants to 13 whereas in the orthotropic case we have 9 independent elastic constants (typically $C_{11}$, $C_{12}$, $C_{13}$, $C_{22}$, $C_{23}$, $C_{33}$, $C_{44}$, $C_{55}$, and $C_{66}$) and in the transversely isotropic case we have 5 independent elastic constants (typically $C_{11}$, $C_{13}$, $C_{33}$, $C_{44}$, $C_{66}$ for the vertical transverse isotropy case (VTI) and $C_{11}$, $C_{12}$, $C_{22}$, $C_{44}$, $C_{55}$ for the horizontal transverse isotropy case (HTI)). Horizontally layered formation media may exhibit vertical transverse isotropy about the vertical axis of a borehole penetrating the formation. Similarly, uniform vertical planar fractures induce horizontal transverse isotropy. When horizontal layering and vertical fractures coexist, then the formation medium may be idealized as an orthotropic elastic solid.

Referring once again to FIG. 1A, the logging tool 10 is shown centralized within the borehole 22. In simple cases of isotropy, transverse isotropy and orthotropy it is a relatively straightforward task to calculate the different phase velocities and energy transport (group velocity) directions. For example, the relationships between formation elastic properties and compressional velocity (Vp) and shear velocity (Vs) measured by the logging tool 10 can be expressed as:

$$C_{11}=\lambda+2\mu=\varrho Vp^2, \tag{5}$$

$$C_{12}=\mu=\varrho Vs^2, \tag{6}$$

$$K=\varrho(Vp^2-4Vs^2/3), \text{ and} \tag{7}$$

$$E=\varrho Vs^2(3Vp^2-4Vs^2)/(Vp^2-Vs^2) \tag{8}$$

for the isotropic case, where
  λ and µ are Lame constants,
  K is the bulk modulus,
  E is Young's modulus, and
  ϱ is the density of the earth formation.

The two independent unknown material elastic constants for the isotropic case, namely $C_{11}$ and $C_{12}$, can be resolved by compressional (Vp) and shear (Vs) velocity measurements in formations together with a supplemental formation density measurement ϱ obtained from a density log measurement or other sources. In soft formations, the shear velocity Vs has to be inferred from the low frequency asymptote value of the dipole (flexural) or quadrupole (screw) components of the measurement.

Axes 1, 2 and 3 are orthogonal axes defining orientation of the tool 10 within the borehole 22. For the transverse isotropy cases, the 3 axis is parallel to the vertical z axis shown in FIG. 2A, and the 1 and 2 axes are horizontal. For the vertical transverse isotropy (VTI) case with 3 axis as the axis of symmetry $$C_{33}=\varrho Vp^2, \text{ and} \tag{9}$$

$$C_{44}=\varrho Vs^2 \tag{10}$$

For the horizontal transverse isotropy (HTI) case with 1 as the axis of symmetry, $$C_{33}=\varrho Vp^2, \text{ and} \tag{11}$$

$$C_{44}=\varrho Vs_1^2; C_{55}=\varrho Vs_2^2 \tag{12}$$

It is assumed that in the VTI case, one compressional (Vp) phase and one shear (Vs) phase propagate along the 3 axis. In the HTI case, it is assumed that one compressional (Vp) phase and two shear phases ($Vs_1$ polarized in 2 axis direction, and $Vs_2$ polarized in 1 axis direction) propagate along the 3 axis. Details of the coordinate systems and their corresponding axes are presented in the following paragraph.

Figure 14A:
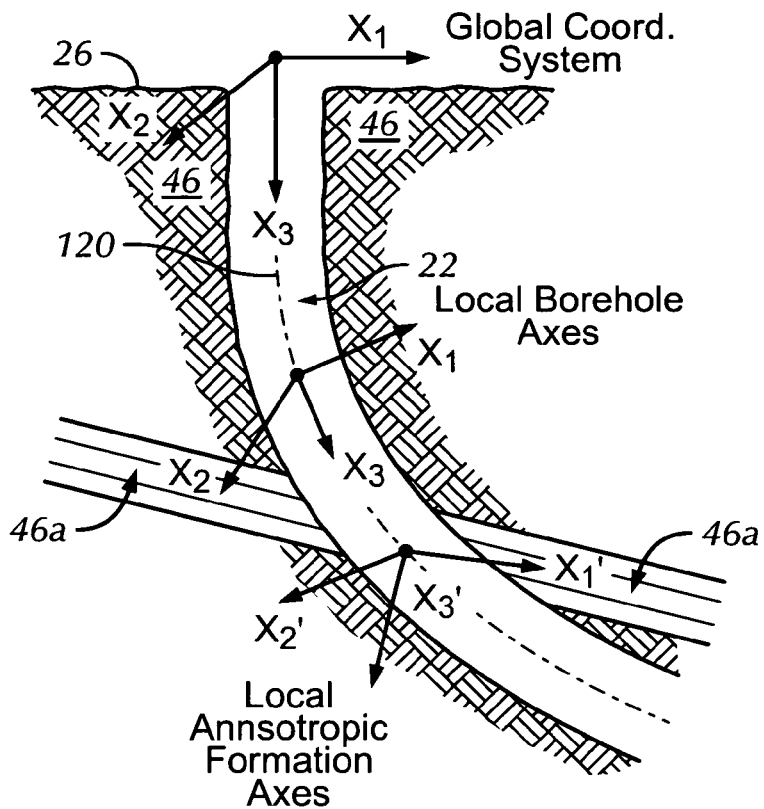
FIG. 14A illustrates the three reference coordinate systems used in disclosing the logging system.

Three reference coordinate systems are used to disclose the logging system and are illustrated in FIG. 14A. The borehole 22, with a major axis 120, penetrates earth formation 47. The global coordinate system ($X_1$, $X_2$, $X_3$) references the location of the well borehole with respect to other geographic features including additional well boreholes (not shown) on the surface of the earth 26. The local borehole coordinate system ($x_1$, $x_2$, $x_3$). references the configuration of the borehole 22, at a given depth within the borehole, where depth is measured axially from the surface 26 of the earth. The local anisotrophic formation coordinate system ($x'_1$, $x'_2$, $x'_3$) references local anisotrophic formation zones 46a with respect to the reference coordinate system ($x_1$, $x_2$, $x_3$) of the borehole 22.

If the transmitter 14 and receiver array 12 of the tool 10 are not aligned with the principal material coordinates in an HTI formation, then the measured quasi shear components can be decomposed into the principal modal components by previously discussed methodology. This case is specifically discussed by Tang et al., "Quantitative Borehole Acoustic Methods", Elsevier, 2004, Chapter 5, pages 159-162 and is entered into this disclosure by reference. The borehole azimuth and slope are typically continuously measured during the logging operation. The local borehole coordinates ($x_1$, $x_2$, $x_3$) are, therefore, known at any location as the tool 10 is conveyed along the borehole. The local borehole coordinates can, therefore, be transformed into the coordinates ($X_1$, $X_2$, $X_3$) of the global coordinate system. The coordinate system ($x'_1$, $x'_2$, $x'_3$) of any formation anisotropy is measured by the logging system with respect to the local borehole coordinates ($x_1$, $x_2$, $x_3$). The local borehole coordinate system ($x_1$, $x_2$, $x_3$) is related to the global coordinate system ($X_1$, $X_2$, $X_3$) by continuously measuring the azimuth and the inclination of the borehole as a function of depth. The local anisotropy formation axes ($x'_1$, $x'_2$, $x'_3$) can, therefore, be transformed to the global coordinate system ($X_1$, $X_2$, $X_3$).

In a general case where there is an absence of strong evidence of a simple geometry (i.e. isotropy, VTI, HTI or orthotropy and principal axes aligned with the borehole coordinate system), it must be assumed that there is coupling among quasilongitudinal (qL), quasishear components (qS), and quasi-Stoneley components (qSt), and the off-diagonal coupling terms must be included. This will be discussed in more detail in subsequent sections of this disclosure. Elastic constant values Cij's are, however, obtained by neglecting this coupling and iterate towards a more complete Cij matrix.

The elastic constant $C_{11}$ can be deduced from VSP measurements or ultrasonic measurements on core samples. The remaining unknown elastic constants $C_{13}$ and $C_{66}$ can be evaluated as follows:

$$C_{13} \sim C_{33}(\sigma_1/\sigma_3); \quad (13)$$

$$C_{66} = K_f / \{(V_f/V_T)^2 - 1\} \quad (14)$$

where $\sigma_3$ is the vertical overburden stress determined by integrating the density log to the depth at which the particular measurement is made, $\sigma_1$ is one of the principal horizontal stresses estimated from a model, $K_f$ is the drilling fluid bulk modulus, $V_f$ is the sound speed in drilling fluid, and $V_T$ is the tube wave velocity asymptote of the Stoneley wave velocity.

The terms $\sigma_3$, $\sigma_1$, $K_f$ and $V_f$ are obtained from independent measurements or from other sources. The term $V_T$ is determined from the response of the logging system. The elastic constant terms $C_{13}$ and $C_{66}$ can, therefore, be computed from equations (13) and (14).

A major difficulty arises in going from the isotropic to the anisotropic case in that number of unknown elastic constants $C_{ij}$ (transversely isotropic-5, orthotropic-9, monoclinic-13) easily far exceed the number of measured independent formation and borehole parameters, and other parameters derived from the logging system response such as one compressional velocity, possibly two shear velocities and a Stoneley velocity. Also, for the general anisotropic case, the group (semblance detected) and phase velocities (phase detected) of waves are different, and the energy propagation is not normal to the acoustic wavefront. For example, measurement in a borehole with a major z axis ($x_3$ axis), and with a horizontally ($x_1$ axis) transversely isotropic medium rotated about the $x_3$ axis may see the medium as up to a monoclinic symmetry. In this case, a form similar to the following material elastic matrix arises:

$$\begin{pmatrix} C_{11} & C_{12} & C_{13} & 0 & 0 & C_{16} \\ C_{12} & C_{22} & C_{23} & 0 & 0 & C_{26} \\ C_{13} & C_{23} & C_{33} & 0 & 0 & C_{36} \\ 0 & 0 & 0 & C_{44} & C_{45} & 0 \\ 0 & 0 & 0 & C_{45} & C_{55} & 0 \\ C_{16} & C_{26} & C_{36} & 0 & 0 & C_{66} \end{pmatrix} \quad (15)$$

In order to resolve the values of the elements $C_{ij}$ of the matrix (15) in the most general practical case of monoclinic symmetry stated above where there is an approximate material symmetry about the plane perpendicular to the borehole $x_3$ axis, the data processing methodology comprises the following steps:

(1) The velocities of quasilongitudinal (qL), quasishear components (qS1 and qS2), and Stoneley wave (qSt) are determined from the dispersion corrected basis image (multipole) velocities from the apparatus described previously in the discussion relating the equations (2) and (3).

(2) A method is used for a crossed dipole-like decomposition into quasifast and quasislow shear velocities.

(3) The effects of cross coupling terms such as $C_{16}$, $C_{26}$, $C_{36}$ are neglected, and first order approximations of $C_{33}$, $C_{44}$, $C_{45}$, $C_{55}$ and $C_{66}$ are calculated from the results of steps (1) and (2).

(4) First order approximations of $C_{13}$, $C_{23}$ are calculated as $C_{13} \sim C_{33}(\sigma_1/\sigma_3)$ and $C_{23} \sim C_{33}(\sigma_2/\sigma_3)$, where $\sigma_1$ and $\sigma_2$ are the horizontal principal stresses and $\sigma_3$ is the vertical overburden stress derived from a density log. The terms $\sigma_1$ and $\sigma_2$ are calculated from geomechanical models and borehole measurements corrected to farfield values. As an example, $$\sigma_1^{nearfield} = r_1 \sigma_3 + s_1 \alpha p, \text{ and}$$

$$\sigma_2^{nearfield} = r_2 \sigma_3 + s_2 \alpha p$$

yields a possible choice for the nearfield horizontal principal stresses close to borehole, where, $r_i = (\upsilon_i/(1-\upsilon_i))$, $s_i = (1-2\upsilon_i)/(1-\upsilon_i)$ $\upsilon_i$ = the Poissons ratio from the principal fast(1) and slow(2) shear velocities, $\alpha$ = the Biot parameter, and p = the pore pressure and $\sigma_3$ is the vertical overburden pressure.

(5) Values of $C_{11}$, $C_{22}$, $C_{12}$ are extracted from other available sources such as VSP surveys or from logging system response in other sections of the borehole where these parameters are known. If these other sources are unavailable and there is a mild azimuthal anisotropy, assume to first order that $$C_{11} \sim (2\epsilon + 1)C_{33},$$

$$C_{22} \sim (2\epsilon + 1)C_{33}; \text{ and}$$

$$C_{12} \sim C_{11} - 2C_{66}; \text{ where}$$

$\epsilon$ is the regional Thomsen parameter.

If these other sources are unavailable and there is a severe azimuthal anisotropy, it is assumed to first order that $$C_{11} \sim (2\epsilon+1)C_{33},$$

$$C_{22} \sim C_{33}, \text{ and}$$

$$C_{12} \sim C_{13}, \text{ where}$$

$\epsilon$ is the regional Thomsen parameter.

An alternate step (5) is presented in a subsequent section of this disclosure.

(6) A first approximation to the $C_{ij}$ matrix is built by using the first order approximations of $C_{ij}$'s from steps (1) to (5) for the anisotropy, and by using coupling information between first quasishear, second quasishear, and quasi-Stoneley waves. The degree of anisotropy and the principal symmetry directions can be determined from an eigenvalue and eigenvector analysis of the matrix $C_{ij}$. Alternately, the local material coordinates $(x'_1, x'_2, x'_3)$ can be rotated or transformed to evaluate the equivalent orthotropic or transversely isotropic case and its coordinate axes with respect to the local borehole axes $(x_1, x_2, x_3)$. In the prior art, methods have been disclosed (e.g. Arts et al, "General Anisotropic Elastic Tensor in Rocks, Approximation, Invariants and Particular Directions", SEG 61$^{st}$ Annual International Meeting, Expanded Abstracts, pp. 1534-1537, 1991) that attempt to find a smaller set of elastic constants for best fitting transversely isotropic or orthotropic medium given a larger set of elastic constants, which is a well-posed problem. Applied to the present invention, this prior art method approximates a noisy smaller set of measured elastic constants by a medium of higher symmetry with an appropriate orientation, which is an ill-posed problem.

(7) The results of step (6) are used to evaluate whether the formation configuration is close to vertical transverse isotropy (VTI) or horizontal transverse isotropy (HTI) or to an orthotropic case.

Figure 14B:
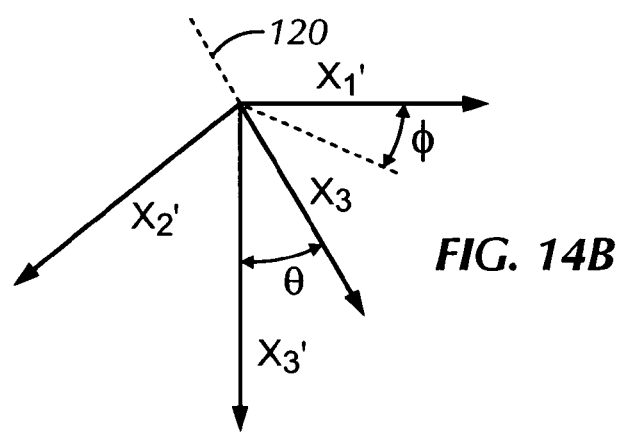
FIG. 14B illustrates the angles $\phi$, $\theta$ which are the azimuthal and polar angles, respectively, of the borehole axis with respect to the local principal coordinate system of a vertical transversely isotropic formation.

(8) Quality indicators are calculated as follows:

(i) If the evaluation (7) indicates that this case is close to VTI, then the quantities $qL^{estimate}$, $qS1^{estimate}$ $qS2^{estimate}$ and $qSt^{estimate}$ are evaluated, where $$qL^{estimate} = f_{vti}(C_{ij}, \phi, \theta),$$

$$qS1^{estimate} = g_{vti}(C_{ij}, \phi, \theta),$$

$$qS2^{estimate} = h_{vti}(C_{ij}, \phi, \theta), \text{ and}$$

$$qSt^{estimate} = k_{vti}(C_{ij}, \phi, \theta)$$

and where $\phi$, $\theta$ are the azimuthal and polar angles, respectively, of the borehole with respect to the local principal coordinate system of the vertical transverse isotropy (see FIG. 14B). The terms $f_{vti}, g_{vti}, h_{vti}$, and $k_{vti}$ are expressions for weak anisotropy that are defined in Thomsen, "Weak Elastic Anisotropy", Geophysics, Vol. 51, pp. 1954-1966, 1986, which is entered into this disclosure by reference.

If this evaluation (7) indicates that this case is close to HTI, then the quantities $qL^{estimate}$, $qS1^{estimate}$ $qS2^{estimate}$ and $qSt^{estimate}$ are evaluated where $$qL^{estimate} = f_{hti}(C_{ij}, \phi, \theta),$$

$$qS1^{estimate} = g_{hti}(C_{ij}, \phi, \theta),$$

$$qS2^{estimate} = h_{hti}(C_{ij}, \phi, \theta), \text{ and}$$

$$qSt^{estimate} = k_{hti}(C_{ij}, \phi, \theta)$$

and $f_{hti}, g_{hti}, h_{hti}$, and $k_{hti}$ are expressions for weak anisotropy that are defined in Ohanian et al, "Explicit Imaging Expressions for Weak Horizontal Transverse Isotropy", SEG 72$^{nd}$ Annual International Meeting, Expanded Abstracts, pp. 153-156, 2002, which is entered into this disclosure by reference.

If this evaluation (7) indicates that this case is close to orthotropic, then the quantities $qL^{estimate}$, $qS1^{estimate}$ $qS2^{estimate}$ and $qSt^{estimate}$ are evaluated where $$qL^{estimate} = f_{ortho}(C_{ij}, \phi, \theta),$$

$$qS1^{estimate} = g_{ortho}(C_{ij}, \phi, \theta),$$

$$qS2^{estimate} = h_{ortho}(C_{ij}, \phi, \theta), \text{ and}$$

$$qSt^{estimate} = k_{ortho}(C_{ij}, \phi, \theta)$$

and $f_{ortho}, g_{ortho}, h_{ortho}$, and $k_{ortho}$ are expressions for weak anisotropy that are defined in Tsvankin, "Seismic Signatures and Analysis of Reflection data in Anisotropic Media", Pergammon Press, 2005, which is entered into this disclosure by reference.

(ii) The quality indicators $QI_c$ are calculated for VTI and HTI and orthotropic cases from the results of the above calculations using the expressions $$QI_c = \{(qL^{meas} - qL^{estimate})^2 + (qS1^{meas} - qS1^{estimate})^2 + (qS2^{meas} - qS2^{estimate})^2 + (qSt^{meas} - qSt^{estimate})^2\}^{1/2}$$

where the quantities on the right hand side of the equation are for either VTI or the HTI or the orthotropic cases, and the index "c" denotes either the VTI or the HTI or the orthotropic case.

(9) The qL, qS1, qS2, qSt coupling assumptions are modified by adjusting the terms $C_{ij}$ and using the formalism detailed in step (8) above.

(10) The iteration process using steps (8) and (9) is continued until the quality indicators $QI_c$ stabilize. Quality indicator stabilization indicates that the best values of the elastic constants $C_{ij}$ have been determined. These values of $C_{ij}$ are then used to determine formation properties of interest relating to formation elastic constants, as detailed in previous sections of this disclosure.

An alternate method can be used in step (5) for increasing the confidence level in determining $C_{11}, C_{22}$ and $C_{12}$. Reviewing briefly prior art, the sonic velocity $(v_3)$ is typically measured along the borehole and, more specifically, along local borehole axis $x_3$. Only $C_{33} = \varrho v_3^2$ can be estimated. No direct estimates of $C_{11}$ and $C_{22}$, and therefore $C_{12}$, are available. It is necessary, therefore, to resort to methods such as VSP data, ultrasonic measurements on borehole core samples, or measures of regional Thomsen parameters in order to estimate $C_{11}$ and $C_{22}$ indirectly.

Estimates of $C_{11}$ and $C_{22}$ based on direct downhole measurements will increase the confidence levels of results obtained from the disclosed logging system. The following is an outline of a direct method based on modifications to disclosures in U.S. Pat. No. 6,050,141 (Tello et al), U.S. Pat. No. 6,189,383 (Tello et al), and U.S. Pat. No. 6,538,958 (Blanlinship et al), which are entered into this disclosure by reference. This method utilizes two independent and orthogonal direct ultrasonic reflection measurements at the mud/rock interface (i.e. at the borehole wall 24 as shown in FIG. 1A) in the $x_1$ and $x_2$ directions (as shown in FIG. 14B) to determine $C_{11}$ and $C_{22}$ as follows:

$$C_{11} = (1/\varrho_{rock})[\varrho_{mud} v_{mud}(1+R_1)/(1-R_1)]^2 \quad (16)$$

$$C_{22} = (1/\varrho_{rock})[\varrho_{mud} v_{mud}(1+R_2)/(1-R_2)]^2 \quad (17)$$

where
- $\rho_{rock}$=the density of rock formation from an independent borehole density measurement,
- $\rho_{mud}$=the density of mud filling the borehole, as disclosed in the methodology of U.S. Pat. No. 6,050,141, and
- $v_{mud}$=the speed of sound in the mud, as disclosed in the methodology of U.S. Pat. No. 6,050,141.

The terms $R_1$, and $R_2$ are the measured reflection coefficients at mud/rock interface in $x_1$ and $x_2$ directions, using concepts disclosed in U.S. Pat. No. 6,050,141. These reflections coefficients must be corrected for invasion or drilling damage if these effects are significant in the nearfield of borehole.

Summary

The borehole instrument comprises an acoustic transmitter 14 and a receiver array 12 comprising a plurality of receiver stations 53 at differing axial spacings $z_n$ from the transmitter. Each receiver station 53 comprises a plurality of azimuthally spaced receiver elements 56. The transmitter 14 is repetitively activated or "fired" as the borehole logging instrument 10 is conveyed along a well borehole. In the preferred embodiment, the receiver array comprises at least four receiver stations, with each receiver station comprising at least 8 angular sectors comprising broadband (500 Hz to 50 kHz) receiver elements. The transmitter is operated in the range of 500 Hz to 20 kHz and pulsed at a repetition rate in the range of 1 to 10 pulses per second. Formation and borehole parameters of interest are obtained by processing and combining responses of the plurality of receiver elements 56 comprising the plurality of axially spaced receiver stations 53.

Processing of measured receiver response data to obtain parameters of interest is briefly summarized as follows:

(1) The transmitter is fired thereby propagating acoustic energy through the borehole environs.

(2) The finely sampled analog pressure field over the receiver array is finely digitized for each receiver element. This analog to digital conversion is preferably performed in the electronics package 16 of the borehole instrument 10.

(3) The acoustic energy propagating over the receiver array is separated into each of the multipole modes, such as monopole, dipole, quadrupole etc, by an angular decomposition. Details of this modal decomposition are presented in the above section of this disclosure entitled "Decomposition of Acoustic Waves and Determination of Waveform Parameters".

(4) Velocities (or slownesses) of each mode components are calculated from decomposed waveforms. Examples of decomposed monopole and dipole waveforms for eight receiver stations (S=8) are shown in FIGS. 8 and 10, respectively. Examples of monopole velocities (or slownesses) and dipole velocities (or slownesses) are shown in FIGS. 9 and 11, respectively.

(5) The identifications of components of each multipole mode as obtained in step (4) are used to determine specific formation and borehole parameters of interest at a location in the borehole at which the components are measured. As an example, monopole phase velocities yield compressional and shear headwaves and Stoneley components if they exist. As another example, dipole phase velocities reveal whether there is birefringence due to anisotropy. Other examples of determination of parameters of interest from multipole mode components are presented in previous sections of this disclosure.

(6) The results of steps (4) and (5) are used to solve the inverse problem to obtain the in the elastic moduli and geophysical properties of the formation as a function of depth in the local coordinate system associated with the borehole.

Details of this step are presented in the section entitled "Elastic Moduli, Degree of Anisotropy and Elastic Symmetry Configuration". Computations associated with this step can be performed in a processor in the electronics package 16 of the borehole tool 10, or alternately in a processor disposed within the surface equipment 40 (see FIG. 1A).

(7) The steps (1) through (6) are repeated yielding the above parameters of interest, measured in the borehole coordinate system, as a function of position within the borehole.

(8) The repetitive results of step (6) or alternately step (7) are transformed into a global coordinate system associated with the exploration or the development well in which they are measured. This allows correlation of similar data measured in a plurality of wells, which yields valuable information optimizing exploration and production drilling in a known hydrocarbon producing area. Implicit in this method is the assumption that an averaging scheme (e.g. Backus method) is used to scale the data between frequency domains.

Variations of the embodiment of the invention will be apparent to those skilled in the art. The above disclosure is to be regarded as illustrative and not restrictive, and the invention is limited only by the claims that follow.

What is claimed is:

1. A method for determining a property of a borehole environs comprising a formation penetrated by a borehole, said method comprising the steps of:
   (a) disposing an acoustic transmitter and an acoustic receiver array within a tool operating within said borehole;
   (b) simultaneously generating a plurality of acoustic modes in said borehole environs with an asymmetric pulse of acoustic radiation emitted by said transmitter;
   (c) measuring responses of said receiver array induced by said pulse, wherein
      (i) said receiver array comprises at least two receiver stations at different axial spacings from said transmitter, and
      (ii) each said receiver station comprises a plurality of receiver elements disposed azimuthally near the periphery of said tool;
   (d) combining said responses to simultaneously identify said modes; and
   (e) determining said property from said identified modes.

2. The method of claim 1 comprising the additional step of determining velocity of each said mode.

3. The method of claim 2 comprising the additional steps of determining amplitude and velocity of types of wave forms induced in said borehole environs.

4. The method of claim 3 comprising the additional step of using said velocities of said modes and said velocities and amplitudes of said types of waveforms to determine a parameter of interest: wherein
   (a) said parameter of interest is determined in terms of local material coordinates; and
   (b) said local material coordinates are related local borehole coordinates which define a location at which said parameter of interest is measured within said borehole.

5. The method of claim 4 comprising the additional steps of determining a plurality of parameters of interest comprising elastic moduli, degree of formation anisotropy, elastic symmetry and other geophysical properties of said formation.

6. The method of claim 4 wherein:
   (a) said transmitter comprises two transmitter elements oriented to yield independent and orthogonal direct ultrasonic reflection measurements at a wall defining said borehole; and (b) said reflection measurements are used to determine elastic constants of said formation.

7. The method of claim 4 comprising the additional step of transforming said local material coordinates of said parameter of interest into global coordinates.

8. The method of claim 1 comprising the additional steps of operating said transmitter repetitively to transmit a plurality of pulses at a repetition rate ranging from about 1 to about 10 pulses per second and at a frequency in the range of about 500 Hertz to about 20 kilohertz.

9. The method of claim 1 wherein a value of said property is independent of relative orientations of major axes of said tool and said borehole.

10. The method of claim 1 wherein a value of said property is independent of sensitivity mismatches in said receiver elements.

* * * * *